3,094,464
ASPIRIN-ANTACID POLYSILOXANE TABLET
Maurice Joullie, Saint-Germain-en-Laye, Michel Laurre, Chatillon-sous-Bagneux, Gabriel Maillard, Puteaux, and Pierre Muller, Paris, France, assignors to Recherches et Propagande Scientifiques, Paris, France, a French body corporate
No Drawing. Filed Mar. 30, 1961, Ser. No. 99,346
Claims priority, application Great Britain Apr. 1, 1960
3 Claims. (Cl. 167—82)

This invention is for improvements in or relating to therapeutic compositions. More particularly it concerns therapeutic compositions containing aspirin in one or other of its well known forms.

Aspirin is one of the most widely used drugs of modern times and, despite the advances made in chemotherapy since acetyl salicyclic acid was first introduced to the medical profession, this product—either in the form of the free acid or in the form of a salt—is still the most commonly prescribed analgesic. Notwithstanding its undoubted advantages, aspirin is well known to produce side effects which in some conditions and with some patients can have serious consequences. In this connection, it has been established that aspirin is a significant mucosal irritant and that, for example, it should be used with extreme caution in patients with known upper gastro-intestinal lesions. By way of further illustration of the dangers attendant upon the use of aspirin, Muir and Cossor in reporting in "The Lancet," March 14, 1959, page 539, on a clinical study of 106 patients admitted with gastro-duodenal haemorrhage, stated that this study convinced them more than ever that aspirin is a dangerous drug, particularly for those in whom it causes indigestion and in those with peptic ulcer. They concluded, with respect to the patients studied by them, that one gastro-duodenal haemorrhage in eight was caused by aspirin, and emphasized the necessity for a much fuller investigation into the effect of aspirin on the stomach.

Many attempts have been made to reduce the side effects of aspirin, some involving a combination of aspirin with other active substances, others with the use of selected salts and still others with special formulations, e.g. the use of an enteric coating.

It is the object of the present invention to provide new pharmaceutical preparations containing aspirin that possess a surprisingly lesser tendency to produce undesirable side effects, more especially showing reduction in irritant effect upon gastric mucosa than aspirin formulations hereinbefore widely used.

According to the present invention, a pharmaceutical tablet for oral ingestion contains aspirin (as hereinafter defined) together with a viscous polysiloxane homogeneously dispersed throughout a pharmacologically acceptable solid absorbent for the polysiloxane.

According to a feature of the present invention, the aforesaid absorbent consists wholly or in part of a pharmacologically acceptable non-alkaline antacid, such antacid being preferably one which, by itself or on reaction with the acid of the stomach, forms a gel stable under gastric conditions.

As with tablets containing other sparingly soluble medicaments, aspirin tablets normally require to be swallowed in conjunction with water or other liquid. Attempts have heretofore been made to obviate the necessity for washing down the gullet the disintegrated particles of an aspirin tablet; it has, for example, been proposed to incorporate glycine into an aspirin tablet along with a disintegrant. While the conjoint use of glycine does to some extent eliminate, in the mouth, the unpleasant taste of acetyl salicylic acid the patient may often experience a burning sensation or irritation in the throat for a time after having chewed the tablet. It is obviously desirable to provide an aspirin table which can be chewed and swallowed without the aid of water or other liquid without, or with reduced tendency to cause, irritant effect upon mucosal linings. In accordance with a further feature of this invention, it has been found that an aspirin tablet containing a significant proportion each of a viscous polysiloxane and of an antacid together with the usual tabletting constituents including a disintegrant and a suitable flavouring substance can be chewed and swallowed without the aid of water or other liquid and without perceptible irritant effect upon the muscosal lining of the throat or stomach. Fully to achieve this result, the aspirin component is employed in the form of coated particles, the coating consisting of ethyl cellulose or other acceptable varnish such as cellulose aceto-phthalate which is enteric in the sense of dissolving either solely or mainly in the intestine. Glycine may, however, also be incorporated in the composition.

In carrying the present invention into effect the solid absorbent for the polysiloxane should of course be compatible with the aspirin component and should not stimulate the production of acid in the stomach on ingestion. Preferably it consists of or comprises one of the antacids known for use in combatting gastric hyperacidity. Such antacid should preferably be non-alkaline: alkaline antacids are less suitable not only because they stimulate the production of acid by the stomach and tend to raise the pH of the body fluids to unacceptably high levels, but also because they are apt to cause rapid hydrolysis of the aspirin. In addition the absorbent or antacid is preferably relatively insoluble so that it remains effective in the stomach for as long as possible before it is removed. Suitable absorbents which are not antacids include aluminium trisilicate, aluminium glycinate, and magnesium silicate. Suitable non-alkaline antacid absorbents include amphoteric substances such as aluminium hydroxide.

Viscous polysiloxanes of the type useful for the purpose of the present invention are well known substances. They should be employed in the form of pharmacologically acceptable viscous fluids having a viscosity of from 100 to 12,500 centistokes at 25° C. Generally speaking, dimethylpolysiloxanes having a viscosity of around 500 centistokes at 25° C. are preferred although other polysiloxanes, e.g. diethylpolysiloxanes, may also be employed.

Compositions of the invention will incorporate ancillary ingredients of the type customarily employed in the tabletting art. More particularly, a gum such as gum tragancanth is added to provide the necessary adhesion of the ingredients. Talc or other suitable excipient is normally also required, as is usually a flavouring substance.

The relative proportions of aspirin, viscous polysiloxane and solid absorbent or antacid present in preparations of the present invention are not critical. Obviously the actual quantity of each ingredient in a tablet will depend upon the size, and therefore weight, of the tablet and the intended daily dosage rate. In general, for a tablet the total weight of which is of the order of 2.5 g. the amount of aspirin is usually of the order of 25%, the siloxane of the order of 1 to 10% and the absorbent or antacid (e.g. aluminium hydroxide) from 10 to 50% by weight of the total composition, the intended dosage rate being a maximum of 4 to 10 daily.

As has been explained hereinbefore a major disadvantage of aspirin, especially when taken over a protracted period, is its tendency to cause or promote peptic ulcer formation. A number of aspirin-containing formulations which reduce the bitter taste and burning sensation in the throat associated with aspirin alone, for example formulations containing glycine, are known. These compositions, however, do little to reduce the irritant effect of the aspirin on the gastric mucosa. With the pharmaceutical preparations of the invention, on the other hand, there is obtained a substantial reduction in the irritation caused by the aspirin, as is illustrated by the experiments described below. It is believed that this reduction in irritation can be ascribed to the following factors. Firstly there is the physical effect of the methyl polysiloxane which forms a protective film over the mucosa of the stomach, so protecting them from the aspirin. Secondly, where the absorbent is an antacid, there is also the biological protection provided by the antacid against hyperacidity. Finally where the aspirin is employed in the form of particles having an enteric coating, this coating helps to prevent release of the aspirin in the stomach. In the preferred form of the invention the mucosa of the stomach are therefore protected from irritation in three different ways.

To demonstrate the effectiveness of the preparation of the invention in reducing the tendency towards peptic ulcer formation, a detailed pharmacological study was carried out to compare the incidence of ulceration in rats consequent upon the administration of aspirin without the additives characteristic of the invention and of aspirin in conjunction with both a polysiloxane and an antacid. The rat was chosen as the test animal because it is extremely sensitive to acetyl salicylic acid. The test animals used were young female rats of the same stock and were reared under the same conditions. The weight of each rat was about 130 gms. For the experiment, the rats were all kept under the same conditions and were fed alike. They were isolated in groups of 10 for fifteen days, at the end of which they were divided into three lots. Lot A contained the control animals. To each animal in lot B was administered 1 cc. of a solution in gum arabic of acetyl salicylic acid containing 45 mg. of acetyl salicylic acid per cc. To each animal in lot C was administered 1 cc. of a solution in gum arabic containing per cc. 45 mg. of acetyl salicylic acid, 112.5 mg. of dimethyl polysiloxane and 225 mg. of aluminium hydroxide. The rats were killed by carotidean section two hours after the administration and their stomachs removed, washed with physiological serum and examined by microscope.

The extent of ulceration in each animal was expressed as a figure from 0 (no ulceration) to 6 (severe ulceration), the results being double checked.

The sum of the figures obtained for each rat in the different lots, each of which contained 50 animals, was as follows:

Lot A _____ 0
Lot B _____ 161.5
Lot C _____ 98

The susceptibility to ulceration was thus reduced by 40% by the presence of the siloxane and aluminium hydroxide, which demonstrates clearly the advantages obtained by the present invention.

The following examples illustrate the invention.

*Example I*

A preparation was made up as follows. 0.35 g. of acetyl salicylic acid is ground up and then mixed with 0.07 g. of dimethylpolysiloxane (viscosity 500 centistokes at 25° C.). To the mixture is added 0.35 g. of aminoacetic acid. Aluminium hydroxide (0.17 g.), lubricant and flavouring are granulated with sugar syrup and the granulated mixture then added to give a mixture of weight 2.00 g. which is tabletted.

*Example II*

Following a procedure similar to that described in Example I, tablets of 2.5 g. were prepared of the following composition.

| | Grams |
|---|---|
| Acetyl salicylic acid | 0.40 |
| Dimethylpolysixolane (viscosity 500 centistokes at 25° C.) | 0.10 |
| Aluminium hydroxide | 0.20 |
| Sucrose, lubricant and flavouring | 1.70 |

*Example III*

Fine granules of acetylsalicylic acid were treated with 2.5% by weight of ethyl cellulose as a 1–5% solution in ethyl acetate. The ethyl acetate was then evaporated off to give granules which were coated at least in part with an enteric coating of ethyl cellulose. This coated aspirin was used to make tablets of 2.5 g. of the following composition.

| | Grams |
|---|---|
| Coated aspirin | 0.40 |
| Dimethylpolysiloxane (viscosity 500 centistokes at 25° C.) | 0.10 |
| Aluminium hydroxide | 0.20 |
| Sucrose, lubricant and flavouring | 1.70 |

The coated aspirin was mixed with half the siloxane and about half the aluminium hydroxide. The remainder of the siloxane and aluminium hydroxide was granulated with the sucrose, using an 80% sugar syrup; the granules so obtained were dried in an oven. The two components were mixed with the addition of the lubricant (talc 3–5% by weight) and flavouring. This mixture, which may suitably be homogenised by a mechanical procedure, was compressed to give tablets of 2.5 g.

*Example IV*

Tablets containing coated aspirin were made by a procedure exactly similar to that described in Example III except that a 1–5% solution of cellulose acetophthalate in ethyl acetate, containing 2% of ethyl pathalate as plasticizer, was used to give the aspirin its enteric coating.

For the purpose of this specification and the appended claims the term "aspirin" means acetyl salicylic acid or a pharmacologically acceptable salt thereof, e.g. the calcium salt.

We claim:

1. A pharmaceutical preparation for oral ingestion in the form of a compressed tablet containing aspirin in the form of particles individually coated with a coating which is at least partially enteric, in association with dimethyl polysiloxane having a viscosity of about 500 centistokes at 25° C., as a homogeneous dispersion in aluminium hydroxide, the polysiloxane constituting between 1 and 10% of the total weight of the composition and the aluminium hydroxide between 8.0 and 8.5 percent of the total weight of the composition.

2. A pharmaceutical preparation for oral ingestion in the form of a compressed tablet containing aspirin in association with a polysiloxane which has a viscosity of from 100 to 12,500 centistokes at 25° C., homogeneously dispersed throughout solid particulate aluminium hydroxide, said polysiloxane representing between 1 and 10 percent of the total weight of the composition.

3. A pharmaceutical preparation for oral ingestion in the form of a compressed tablet containing aspirin in the form of particles individually coated with a coating which is at least partially enteric, in association with a polysiloxane which has a viscosity of from 100 to 12,500 centistokes at 25° C., as a homogeneous dispersion in aluminium hydroxide, said polysiloxane representing between 1 and 10 percent of the total weight of the composition.

References Cited in the file of this patent

UNITED STATES PATENTS

| 2,698,332 | Beekman | Dec. 28, 1954 |
| 2,951,011 | Feinstone | Aug. 30, 1960 |
| 2,993,837 | Millar et al. | July 25, 1961 |